United States Patent Office 2,706,661
Patented Apr. 19, 1955

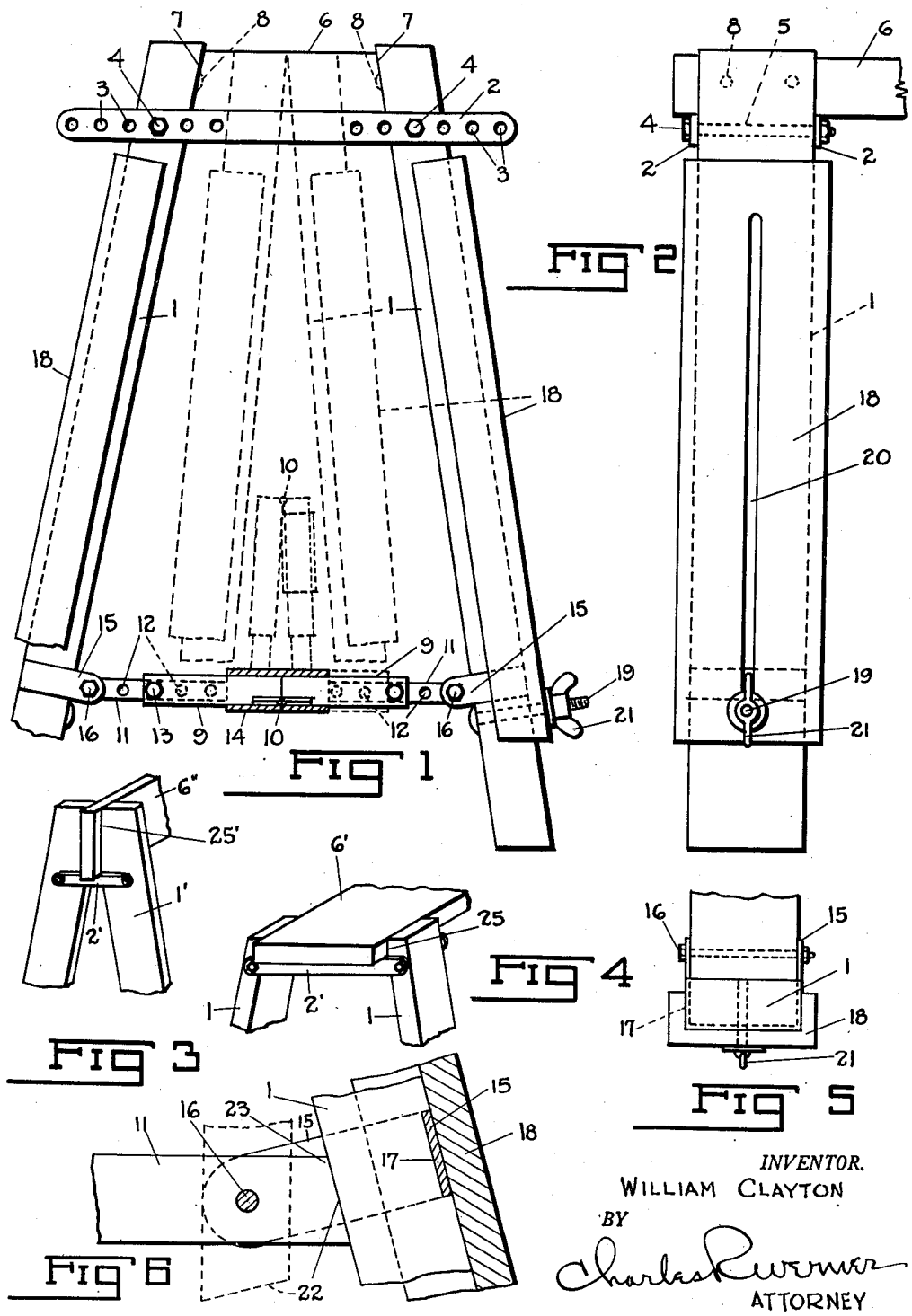

2,706,661

COLLAPSIBLE SUPPORT

William Clayton, Denver, Colo., assignor of one-half to Michael Covillo, Denver, Colo.

Application August 20, 1949, Serial No. 111,377

3 Claims. (Cl. 304—5)

This invention relates in general to supports such as horses, trestles and the like generally used in construction work and specifically to a collapsible support which can be quickly and easily assembled for use or knocked down for portability and storage.

Although many forms of collapsible supports have been devised, I have endeavored to retain simplicity and ease of operation with maximum rigidity which, in a support, is a prime requisite. And, while generally, adjustability does not render a device patentable, in certain instances where adjustability makes a device universally usable it has been considered a patentable feature.

In my support I have used construction which will make it operative in supporting transverse members of various widths and for different purposes.

The objects of my invention are, first; to provide a support to be removably clamped to a transverse member, including a pair of legs, removable cross members adjacent the upper end of the legs, a collapsible cross member between the two legs at a substantial distance below the top thereof.

Second; to cut the ends of the collapsible cross members at an angle corresponding to the angle of the legs when assembled to form a rigid, immovable structure tightly gripping the transverse member.

Third; to make the collapsible cross member of a pair of centrally hinged members, the ends being pivoted adjacent to the legs, and a telescoping lock member to hold the hinged arms in rigid bracing position.

Fourth; to provide mounting brackets for the collapsible cross member so constructed, arranged and pivotally carrying said collapsible cross member that downward force on the collapsible cross member will be required to snap it into transverse locked bracing position and upward force will be required to snap it out of bracing position into collapsed position.

Fifth; to provide recesses in the legs for receiving the mounting brackets.

Sixth; to provide slidably adjustable leg members on the legs so arranged as to retain the mounting brackets in their recesses at any position of the adjustable leg members.

Seventh; to provide securing members for the adjustable leg members located in close proximity to the mounting brackets for secure retention thereof.

Eighth; to provide in a support adapted to be removably clamped to a transverse member substantially rectangular in cross sectional area, a pair of legs, the inner opposing surfaces of the upper ends of the legs having angles which will render said ends substantially parallel to each other and to the side edges of the transverse member.

Ninth; to provide projecting members extending inwardly from the inner surfaces of the upper ends of the legs to grip the side edges of the transverse member.

Tenth; to provide removable upper cross members and a collapsible lower cross member adjustably secured to the legs for reception of transverse members of different widths.

Eleventh; to provide legs positioned with their greatest width perpendicular to the transverse member, said transverse member being carried between the legs with its greatest width vertically, the edges of the legs bearing against the transverse members being cut at an angle rendering said edges parallel to each other and to the sides of the transverse member against which they bear.

Other objects and advantages as well as the construction and operation of my invention will be apparent by reference to the following specification in connection with the accompanying drawing in which:

Fig. 1 is an end elevational view of one of my assembled supports, dotted lines indicating the knockdown position assumed by the parts.

Fig. 2 is a side elevational view of the same.

Fig. 3 is a reduced fragmentary, isometric view of a modified form of my invention showing the upper ends of the legs and a portion of the transverse member.

Fig. 4 is a similar view of another form of my invention.

Fig. 5 is a view looking upward at the leg shown in Fig. 2.

Fig. 6 is an enlarged fragmentary detail view of the mounting bracket and the leg, adjustable sliding leg and the collapsible cross member.

Referring now to the drawing by numerals of reference, 1 designates the legs joined at their upper ends by removable cross members 2, having a plurality of openings 3 to receive fastening members 4 adapted to pass through openings 5 in the legs.

A transverse member 6, which may be of any desired length or width, is adapted to rest on the cross members 2, the side edges 7 being chamfered to correspond substantially with the angle formed by the legs 1. Projections 8 on the legs may be provided and will be embedded in the transverse member for greater rigidity between said transverse member and the legs.

Located at a substantial distance below the top of the legs 1 is the collapsible cross member comprising a pair of rigid members 9 suitably hinged at 10 and adjustably carrying members 11, suitable openings 12 and fastening members 13 being provided for adjustment purposes. A lock member 14 slides over members 9 and when positioned over the hinge 10 will lock the cross member in rigid non-collapsible position.

The ends of the collapsible cross member, namely members 11 are pivotally carried in mounting brackets 15 by means of fastening members 16. Recesses 17 are provided in the legs 1 for reception of the mounting brackets 15 which are retained in position in the recess by sliding leg members 18 which may be U-shaped in cross sectional area, a fastening member 19 passing through the leg 1 and through a longitudinal slot 20 in the sliding leg member 18, a wing nut 21 being used for ready loosening and tightening of the fastening member and adjustment of the leg.

It will be noted that the fastening member 19 is located in the leg 1 close to mounting bracket 15 and that the sliding leg member 18 is at all times in engagement with the mounting bracket so that it will not be disengaged from the recess 17.

As seen in the detail in Fig. 6 the outer ends 22 of members 11 are beveled at an angle corresponding substantially with the angle of the legs 1 so that when assembled said ends 22 will be flush against said legs.

The pivot 16 on the collapsible cross member is located at a point, the diagonal distance from which to the corner 23, at the extreme end of the collapsible cross member, is greater than the perpendicular distance from the said point to the end face 22 of the collapsible cross member, whereby the collapsible cross member may be forced into and out of extended position and cannot be accidentally collapsed.

The location of the hinge 10 below "dead center" of the collapsible cross member, and the inwardly directed opposing horizontal forces exerted by the legs 1 as the lower sections thereof are moved outwardly, and as the upper portions of the legs bearing against the transverse member are moved inwardly, causes the collapsible cross member to snap into and out of bracing position, depending on which direction vertical force is brought to bear thereagainst, the full end surfaces 22 bearing against legs 1 and providing extreme rigidity in the supporting structure.

It is important that the mounting brackets 15 are disposed at right angles to the legs as shown in the detailed view in Fig. 6.

In the modification shown in Fig. 4 the transverse member 6' is substantially rectangular in cross section. It may be any stock size of lumber such as a 2 x 4, 2 x 10 or the like. The edges 25 of the legs above the cross members 2' may be formed at the proper angle so that when assembled these edges will be substantially parallel to each other and to the side edges of the transverse member 6'. Also, as shown in Fig. 4, the cross members 2' may be of any desired length for use with transverse members of specific widths, change in size of the support being accomplished by changing to a cross member 2' of different length. As shown, the transverse member 6' may be any size and may be in the form of a table top or the like.

In the modification shown in Fig. 3, the transverse member 6" is shown positioned on edge, with the widest portion of the legs 1' positioned perpendicular to the transverse member, the angular edges 25' being parallel to each other and resting for their full length against the transverse member 6".

In using any of the different forms of my invention, after the removable cross members 2 or 2' are assembled, while the collapsible cross member is still in collapsed position the transverse member is laid on the removable cross members and then downward pressure is brought to bear against the collapsible cross member at the central hinged portion thereof, pressure being continued until the legs have moved outwardly to bring the edges of the legs 1 into intimate contact with the transverse member, the collapsible cross member snapping into substantially horizontal position forming a rigid, immovable structure. The safety lock member 14, when moved into position over hinge 10, prevents accidental collapse of the structure.

Due to the construction and arrangement of the member 11 and mounting brackets 15, when in assembled position there will be a constant tension on the mounting bracket toward the recess and an outward or compression force is being exerted by the collapsible cross member against the legs, greatly enhancing the rigidity of the structure.

The transverse member will be gripped so securely that there will be no play or give between the transverse member and legs.

From the foregoing it will be apparent that I have provided a relatively simple and inexpensive form of collapsible support which is universally adjustable to accommodate transverse members of a wide variety of widths and which, when assembled, forms an extremely rigid structure and when disassembled will form a compact easily portable structure.

It is obvious that changes in form, proportion and details of construction may be resorted to without departing from the spirit of my invention and I reserve all rights to such changes as come within the scope of these specifications and the claims which follow.

What I claim as new and desire to secure by Letters Patent is:

1. In a support adapted to be removably clamped to a transverse member, a pair of legs, cross members adjacent the upper end of the legs, a collapsible cross member between the two legs at a substantial distance below the top thereof, a U-shaped mounting bracket on each leg, a notch in each leg receiving the mounting bracket, the outer face of the mounting bracket being flush with the outer face of the leg, a longitudinally adjustable leg member on each leg, the adjustable leg member being U-shaped in cross section, the web and sides of the adjustable leg member bearing against the outer face of the mounting bracket, a longitudinal slot in the web of the adjustable leg, a bolt passing through each leg and the longitudinal slot in the adjustable leg in close proximity to the mounting bracket, a portion of the adjustable leg extending below the bolt and slot when said adjustable leg is in raised position, and a portion of the adjustable leg extending above the bolt and slot when the adjustable leg is in lowered position, whereby the mounting bracket will be at all times retained in the notch of the leg by the web and sides of the adjustable leg.

2. In a support adapted to be removably clamped to a transverse member, a pair of legs, cross members adjacent the upper end of the legs, a collapsible cross member between the two legs at a substantial distance below the top thereof, U-shaped mounting brackets flush with the legs for receiving the collapsible cross member, a U-shaped adjustable leg member carried by each leg in continuous contact with the web of and retaining each mounting bracket on its leg throughout the adjustable movement of the adjustable leg member.

3. In a support adapted to be removably clamped to a transverse member, a pair of legs, cross members adjacent the upper end of the legs, a collapsible cross member between the two legs at a substantial distance below the top thereof, a U-shaped mounting bracket on each leg having web and sides flush with said leg for receiving the collapsible cross member, an adjustable U-shaped leg member carried by each leg in continuous contact therewith and with the mounting bracket and retaining said mounting bracket on the leg throughout the longitudinally adjustable movement of the adjustable leg member, a slot in the adjustable leg member, and a securing member carried by each leg for each slot of the adjustable leg member positioned adjacent the mounting bracket, and limiting the longitudinal movement of the adjustable leg member.

References Cited in the file of this patent

UNITED STATES PATENTS

| | | |
|---|---|---|
| 91,979 | Sliker | July 29, 1869 |
| 244,360 | Griffith | July 12, 1881 |
| 480,342 | Poland | Aug. 9, 1892 |
| 565,338 | Ernest | Aug. 4, 1896 |
| 862,505 | Perrin | Aug. 6, 1907 |
| 914,104 | Binney | Mar. 2, 1909 |
| 1,243,520 | Helwig | Oct. 16, 1917 |
| 1,376,150 | Miller | Apr. 26, 1921 |
| 1,398,471 | Smart | Nov. 29, 1921 |
| 1,699,035 | Tjelde | Jan. 15, 1929 |
| 1,713,359 | Thomas et al. | May 14, 1929 |
| 2,006,574 | Kask | July 2, 1935 |
| 2,317,444 | Dalton | Apr. 27, 1943 |

FOREIGN PATENTS

| | | |
|---|---|---|
| 10,001 | Great Britain | July 11, 1908 |